US012775570B2

(12) United States Patent
Radke et al.

(10) Patent No.: US 12,775,570 B2
(45) Date of Patent: Oct. 27, 2026

(54) OPTICAL BRIDGE INTERCONNECT UNIT FOR ADJACENT PROCESSORS

(71) Applicant: Advanced Micro Devices, Inc., Santa Clara, CA (US)

(72) Inventors: Robert E. Radke, Austin, TX (US); Christopher M. Jaggers, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/185,252

(22) Filed: Mar. 16, 2023

(65) Prior Publication Data

US 2023/0222079 A1 Jul. 13, 2023

Related U.S. Application Data

(63) Continuation of application No. 17/218,793, filed on Mar. 31, 2021, now Pat. No. 11,620,248.

(51) Int. Cl.
*G06F 13/40* (2006.01)
*H04B 10/80* (2013.01)

(52) U.S. Cl.
CPC ....... *G06F 13/4027* (2013.01); *H04B 10/801* (2013.01)

(58) Field of Classification Search
CPC .......................... H04B 10/801; G06F 13/4027
See application file for complete search history.

(56) References Cited

U.S. PATENT DOCUMENTS 7,272,274 B1 9/2007 Albers et al.
9,223,377 B1 * 12/2015 Nachum ............... G06F 1/3209
9,425,893 B1 8/2016 Srinivasan et al.
11,620,248 B2 4/2023 Radke et al.
(Continued)

FOREIGN PATENT DOCUMENTS

KR 20180011330 A 1/2018

OTHER PUBLICATIONS

"AORUS Geforce RTX NVlink™ Bridge For 30 Series", Product Specification, Giga-Byte Technology Co., Ltd., 3 pages, https://www.gigabyte.com/Graphics-Card/GC-ANVLINK#kf. [Retrieved Oct. 27, 2020].
"PCI Express—Serial RapidIO Bridge Board", Product Specification, Advanet Inc., 2 pages, https://www.eurotech.com/DLA/datasheets/Products_Eurotech/AdEXP1566_sf.pdf. [Retrieved Oct. 27, 2020].
Conley, Reginald, "PCI Express over optical cabling: Performance, simplicity, efficiency", Network World, Mar. 1, 2012, 5 pages, https://www.networkworld.com/article/2186464/pci-express-over-optical-cabling--performance--simplicity--efficiency.html. [Retrieved Oct. 27, 2020].

(Continued)

*Primary Examiner* — Nimesh G Patel
(74) *Attorney, Agent, or Firm* — Kowert, Hood, Munyon, Rankin & Goetzel, P.C.; Rory D. Rankin

(57) ABSTRACT

A system and method for efficient data transfer in a computing system are described. A computing system includes multiple nodes that receive tasks to process. A bridge interconnect transfers data between two processing nodes without the aid of a system bus on the motherboard. One of the multiple bridge interconnects of the computing system is an optical bridge interconnect that transmits optical information across the optical bridge interconnect between two nodes. The receiving node uses photonic integrated circuits to translate the optical information into electrical information for processing by electrical integrated circuits. One or more nodes switch between using an optical bridge interconnect and a non-optical bridge interconnect based on one or more factors such as measured power consumption and measured data transmission error rates.

20 Claims, 8 Drawing Sheets

(56) References Cited

U.S. PATENT DOCUMENTS

| | | | | |
|---|---|---|---|---|
| 2003/0128911 | A1 | 7/2003 | Ravikanth et al. | |
| 2005/0215227 | A1 | 9/2005 | Vu et al. | |
| 2010/0315752 | A1* | 12/2010 | Rabu | H01R 31/06 174/250 |
| 2010/0332871 | A1* | 12/2010 | Allalouf | G06F 9/5027 713/320 |
| 2011/0181294 | A1* | 7/2011 | Ziegler | G01R 31/66 324/538 |
| 2012/0236870 | A1 | 9/2012 | Klein | |
| 2012/0266027 | A1 | 10/2012 | Itoyama et al. | |
| 2013/0205164 | A1* | 8/2013 | Tanaka | H04L 41/50 714/E11.078 |
| 2015/0295756 | A1 | 10/2015 | Mn et al. | |
| 2015/0309945 | A1 | 10/2015 | Katayama et al. | |
| 2017/0019186 | A1* | 1/2017 | Wiley | H04B 10/801 |
| 2017/0105175 | A1* | 4/2017 | Gast | H04W 52/34 |
| 2018/0102978 | A1 | 4/2018 | Shen et al. | |

OTHER PUBLICATIONS

International Search Report and Written Opinion in International Application No. PCT/US2022/022685, mailed Jul. 25, 2022, 10 pages.

Wade et al., "TeraPHY: A Chiplet Technology for Low-Power, High-Bandwidth In-Package Optical I/O", Presentation, Technical Paper, Aug. 17, 2019, 48 pages, https://ayarlabs.com/teraphy-a-chiplet-technology-for-low-power-high-bandwidth-in-package-optical-i-o/. [Retrieved Oct. 27, 2020].

European Patent Application No. 22718421.5 Examination Report, mailed Feb. 11, 2025, 6 pages.

Korean Office Action in Patent Application No. 10-2023-7037015, dated Apr. 25, 2025, 10 pages.

* cited by examiner

OPTICAL BRIDGE INTERCONNECT UNIT FOR ADJACENT PROCESSORS

CROSS REFERENCE TO RELATED APPLICATIONS

This application is a continuation of U.S. patent application Ser. No. 17/218,793, now U.S. Pat. No. 11,620,248, entitled "OPTICAL BRIDGE INTERCONNECT UNIT FOR ADJACENT PROCESSORS", filed Mar. 31, 2021, the entirety of which is incorporated herein by reference.

BACKGROUND

Description of the Relevant Art

In computing systems, multiple applications exploit parallel processing and large amounts of shared memory. Examples of these applications are machine learning applications, entertainment and real-time applications, as well as some business, scientific, medical and other applications. These computing systems use processing units (e.g., CPU, GPU, etc.) with more than one processing core, and, in some cases, use side-by-side stacked chips to offer more computational capability and/or more data storage. The processing units of these computing systems transmit and receive large amounts of data between one another and with a system memory. The data is transferred in this manner through an interconnect, such as a communication fabric, based on a particular communication protocol.

In many cases, the interconnect transfers data while supporting relatively wide packets, since a high number of physical wires are available. However, when connecting separate dies together via the interconnect, and when connecting separate processing nodes together, the data is transferred over a significantly lower number of physical wires, which limits available bandwidth. In some cases, the link physical wires transfer data with a data rate that is a multiple of the physical wire data rate on the die. However, there is still a significant bandwidth reduction when communicating between die and between nodes.

In addition, when a transmitter, such as a graphics processing unit (GPU) in a processing unit, sends packets at a rate faster than a rate that a receiver, such as the interconnect, can receive packets, data corruption occurs through data collision at the receiver. A conservative approach of reducing the sending data rate of packets from the transmitter prevents data corruption, but it also further reduces the link bandwidth efficiency.

In view of the above, efficient methods and systems for performing efficient data transfer in a computing system are desired.

Figure 1:
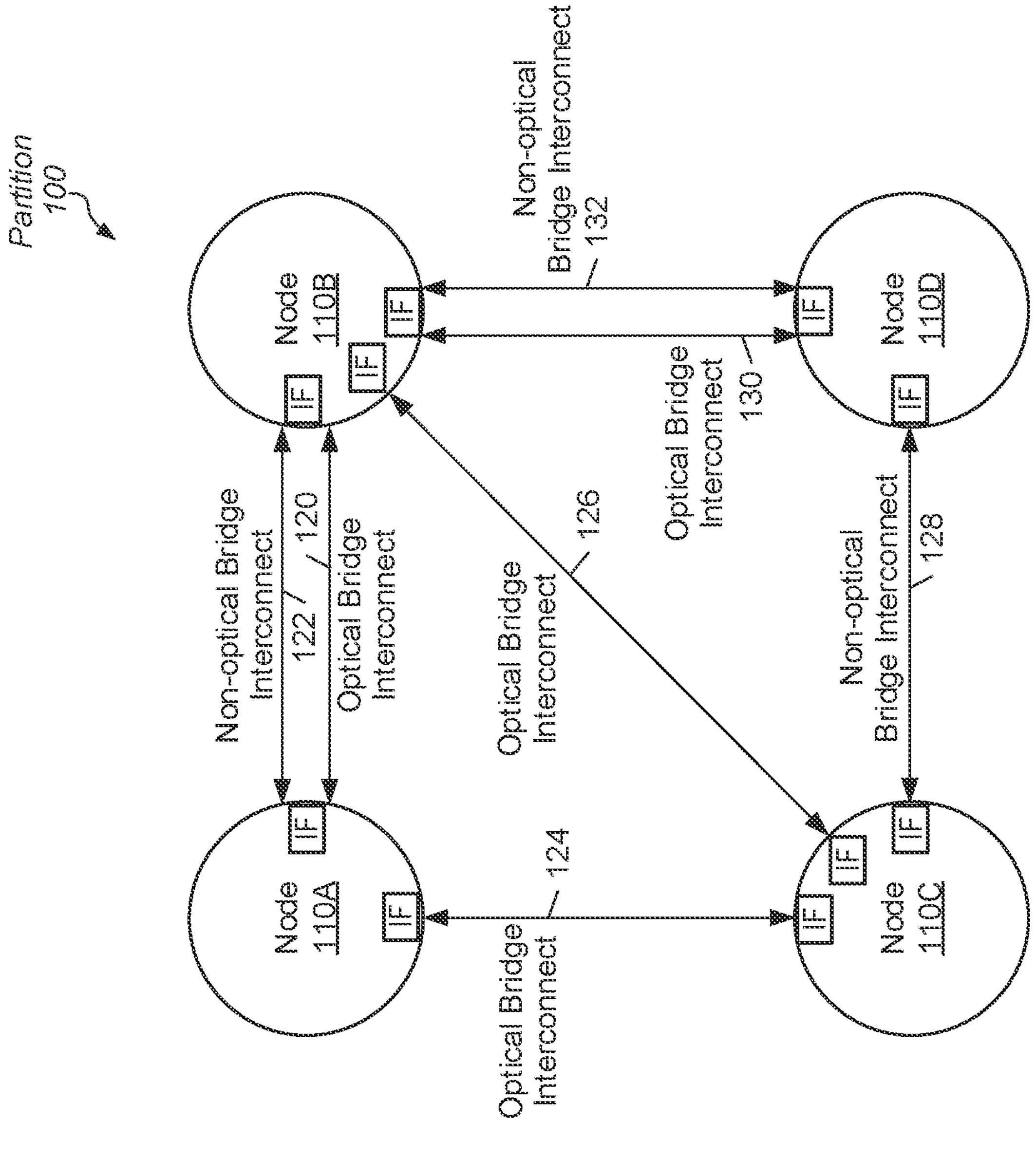
FIG. 1 is a generalized diagram of one embodiment of a partition of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Various systems, apparatuses, and methods for performing efficient data transfer in a computing system are disclosed. In various embodiments, a computing system includes a host processor that assigns tasks to processing nodes of a multi-node partition. As used herein, a "processing node" is also referred to as a "node." The nodes include at least one or more processors and local memory. In an embodiment, the host processor is a central processing unit (CPU) and a node processor is a graphics processing unit (GPU). In some embodiments, the nodes are non-uniform memory access (NUMA) nodes utilizing GPUs to process parallel data tasks. For example, the processing nodes execute tasks for machine learning applications, entertainment and real-time applications using video graphics rendering, cryptography, garbage collection as well as some business, scientific, medical and other applications. Compilers extract parallelized tasks from program code to execute in parallel on the system hardware.

In various embodiments, the nodes are expansion cards inserted in an expansion socket or slot on a motherboard. In an embodiment, one or more of the nodes are video graphics cards inserted in a corresponding socket or slot on the motherboard. Each of the expansion cards and the graphics cards is a printed circuit board that includes semiconductor chips, copper wire interconnects, interfaces and a row of signal pins that insert into the corresponding socket or slot on the motherboard.

The computing system also includes a communication bridge that uses one or more bridge interconnects to transfer data between two processing nodes without the aid of a system bus on the motherboard. For example, the host processor, one or more peripheral devices, and system memory transfers data with the processing node through a system bus on the motherboard. However, the processing node is capable of directly transferring data with another processing node through the bridge interconnect without sending any signals on the motherboard. In various embodiments, the communication bridge is a bridge card. Similar to an expansion card or a video card, the bridge card is a printed circuit board. However, the bridge card does not include a row of pins to insert into a socket or a slot on the motherboard.

In some implementations, the bridge card does not include semiconductor chips, but rather only interconnects between connectors on either side of the bridge card. Each of the connectors connects to a processing node, which allows the processing nodes to communicate with one another through the interconnects of the bridge card. In other implementations, the bridge card includes one or more semiconductor chips to provide interconnect logic provided by hardware when transferring data back and forth between two or more processing nodes.

In various embodiments, one of the bridge interconnects of the bridge card is an optical bridge interconnect. Each of the two paired processing nodes use photonic integrated circuits at corresponding optical connectors to translate between electrical data (signals) and optical data (signals). The optical data is transmitted across the optical bridge interconnect between the two processing nodes. The electrical data corresponding to the optical data is processed by electrical integrated circuits at the two processing nodes.

Similar to the motherboard and other printed circuit boards, such as expansion cards, network cards, and video cards, the bridge card utilizes a glass-reinforced epoxy laminate material. This material provides relatively high mechanical strength while also providing electrical insulation between interconnects and semiconductor chips. One example of the glass-reinforced epoxy laminate material is the FR-4 (or FR4) glass epoxy. The bridge card includes one or more signal routes embedded in the FR-4 material on a top or a bottom layer of the printed circuit board. Rather than use copper wire in these embedded one or more signal routes, the bridge card uses a fiber optic cable embedded in the FR-4 material. The embedded fiber optic cable transfers optical data as light waves between two ends of the bridge card. In some embodiments, this optical bridge interconnect of the bridge card uses a single embedded fiber optic cable to replace 80 or more embedded copper traces for transferring signals between two processing nodes.

In an embodiment, one or more bridge cards are a hybrid bridge card with one or more optical bridge interconnects and one or more non-optical bridge interconnects for transferring data directly between two processing nodes. The nodes of the multi-node partition manage data transfer across the one or more bridge interconnects (e.g., optical and non-optical bridge interconnects) of the bridge card. In some embodiments, one or more of the processing nodes and circuitry on the bridge card switches between using an optical bridge interconnect of the bridge card and a non-optical bridge interconnect of the bridge card based on one or more factors. Examples of the factors are measured power consumption, measured data transmission error rates, a hint from an application, and so on.

Referring to FIG. 1, a generalized block diagram of one embodiment of a multi-node partition 100 is shown. In the illustrated embodiment, the partition 100 includes multiple processing nodes 110A-110D with bridge interconnects 120-132 supporting data transfer between processing nodes. Each of the processing nodes 110A-110D includes at least one or more processors and local memory. As used herein, a "processing node" is also referred to as a "node," and a "partition" is also referred to as a "hive" when a corresponding computing system utilizes the virtualization of hardware. In one embodiment, the partition 100 is a multi-chip module (MCM) placed in a socket of a multi-socket motherboard in a desktop computer or a server. In other embodiments, one or more of the nodes 110A-110D are separate expansion cards inserted in a corresponding socket or slot on a motherboard. In an embodiment, one or more of the nodes 110A-110D are video graphics cards inserted in a corresponding socket or slot on the motherboard. Host processors, power controllers, interrupt controllers, and phased locked loops (PLLs) or other clock generating circuitry, and so forth are not shown for ease of illustration. Although four nodes 110A-110D and seven bridge interconnects 120-132 are shown, in other embodiments, another number of nodes and bridge interconnects are used.

In some embodiments, a host processor assigns tasks to the multi-node partition 100, whereas, in other embodiments, the partition 100 relies on processors within the nodes 110A-110D to assign and transfer tasks to one another. In some embodiments, the nodes 110A-110D execute tasks for machine learning applications, entertainment and real-time applications using video graphics rendering, cryptography, garbage collection as well as some business, scientific, medical and other applications. Compilers extract parallelized tasks from program code to execute in parallel on the hardware of partition 100. The nodes 110A-110D communicate with any host processors, system memory and input/output (I/O) devices through an interconnect (not shown) such as a communication fabric and/or a system bus on the motherboard. However, the nodes 110A-110D are capable of communicating directly with one another through a communication bridge without transferring signals on the motherboard.

Each of the bridge interconnects 120-132 transfers data between two processing nodes without the aid of a system bus on the motherboard. For example, other components external to the partition 100, such as any host processor, one or more peripheral devices, and system memory, transfers data with the nodes 110A-110D through a system bus on the motherboard, one of a variety of universal serial bus (USB) ports, or a dedicated display port. However, a node of nodes 110A-110D directly transfers data with another node of nodes 110A-110D through one of the bridge interconnects 120-132. In some embodiments, the bus on the motherboard uses a communication protocol such as PCIe (Peripheral Component Interconnect Express), Infinity Fabric from Advanced Micro Devices, Inc., and Infinity Architecture from Advanced Micro Devices, Inc. In some embodiments, the interface circuitry for the bridge interconnects 120-132 supports a communication protocol such as the xGMI (inter-chip global memory interconnect) for GPU-to-GPU interconnections from Advanced Micro Devices, Inc. However, other types of communication protocols are possible and contemplated.

In some embodiments, the nodes 110A-110D are fully connected, whereas, in other embodiments, there are less bridge interconnects than seven and some of the nodes 110A-110D are not connected to one another node through any bridge interconnect. Similar to an expansion card or a video card, the one or more bridge cards that include the bridge interconnects 120-132 are printed circuit boards. However, the one or more bridge cards do not include a row of pins to insert into a socket or a slot on the motherboard. Rather, the one or more bridge cards are directly connected through connectors to corresponding nodes of the nodes 110A-110D. The one or more bridge cards utilize a glass-reinforced epoxy laminate material to implement the printed circuit board with copper traces embedded in grooves of this epoxy laminate material on a top and/or bottom layer to implement the non-optical interconnects 122, 128 and 132. The one or more bridge cards have fiber optic cables embedded in grooves of this epoxy laminate material on a top and/or bottom layer to implement the optical interconnects 120, 124, 126, and 130. Therefore, the non-optical interconnects 122, 128 and 132 in addition to the optical interconnects 120, 124, 126, and 130 provide rigid signal interconnects between two processing nodes. Accordingly, the partition 100 does not rely on flexible signal cables located externally from a bridge card to implement the bridge interconnects 120-132.

For the optical bridge interconnect 120, node 110A and node 110B use photonic integrated circuits at corresponding optical connectors to translate between electrical data (signals) and optical data (signals). The optical data (signals) are transmitted across the optical bridge interconnect 120 between the nodes 110A and 110B. The translated electrical data (signals) are processed by electrical integrated circuits in the nodes 110A and 110B. The optical bridge interconnects 120, 124, 126, and 130 typically provide faster data transfer rates than the non-optical bridge interconnects 122, 128 and 132. In addition, the optical bridge interconnects 120, 124, 126, and 130 typically consume less power during data transmission than the non-optical bridge interconnects 122, 128 and 132.

As described earlier, a bridge card utilizes a glass-reinforced epoxy laminate material to implement the printed circuit board with one or more copper traces embedded in grooves of this epoxy laminate material on a top and/or bottom layer in addition to one or more fiber optic cables embedded in grooves of this epoxy laminate material on the top and/or bottom layer. Such a bridge card is a hybrid bridge card. Other bridge cards use only fiber optic cables embedded in grooves of this epoxy laminate material on the top and/or bottom layer, and these bridge cards are optical bridge cards. Still other bridge cards use only copper traces embedded in grooves of this epoxy laminate material on the top and/or bottom layer, and these bridge cards are non-optical bridge cards. In one example, a hybrid bridge card is used between node 110A and node 110B. This hybrid bridge card uses the optical bridge interconnect 120 and the non-optical bridge interconnect 122. Similarly, a hybrid bridge card is used between node 110B and node 110D. This hybrid bridge card uses the optical bridge interconnect 130 and the non-optical bridge interconnect 132. In some embodiments, a bridge card is a three-way bridge card. Although not shown, in some embodiments, a three-way bridge card, which supports optical bridge interconnects, allows a first node to simultaneously transfer data to a second node via a first optical bridge interconnect and to a third node via a second optical bridge interconnect.

In one example, node 110A is capable of directly transferring data with node 110B through the bridge interconnect 120. Each of nodes 110A and 110B includes connectors and corresponding interface circuitry to support data transfer through the optical bridge interconnect 120. The boxes marked as "IF" within the nodes 110A-110D are interfaces that support one or more of optical data transmission and non-optical data transmission between two nodes of the nodes 110A-110D. In addition, based on particular factors, the interfaces marked as "IF" support steering data transmission between optical bridge interconnects and non-optical bridge interconnects when both interconnects are available. Examples of the particular factors are a measurement of power consumption of a node compared to a threshold and a measure of data transmission error rates compared to a threshold. Another example of the particular factors is a programmable configuration register storing an indication of a data type that should be transmitted by a particular one of an available optical bridge interconnect and an available non-optical bridge interconnect. In one example, information of an audio file is transmitted across an available non-optical bridge interconnect, whereas, information of a video frame and other data are transmitted across an available non-optical bridge interconnect.

Figure 2:
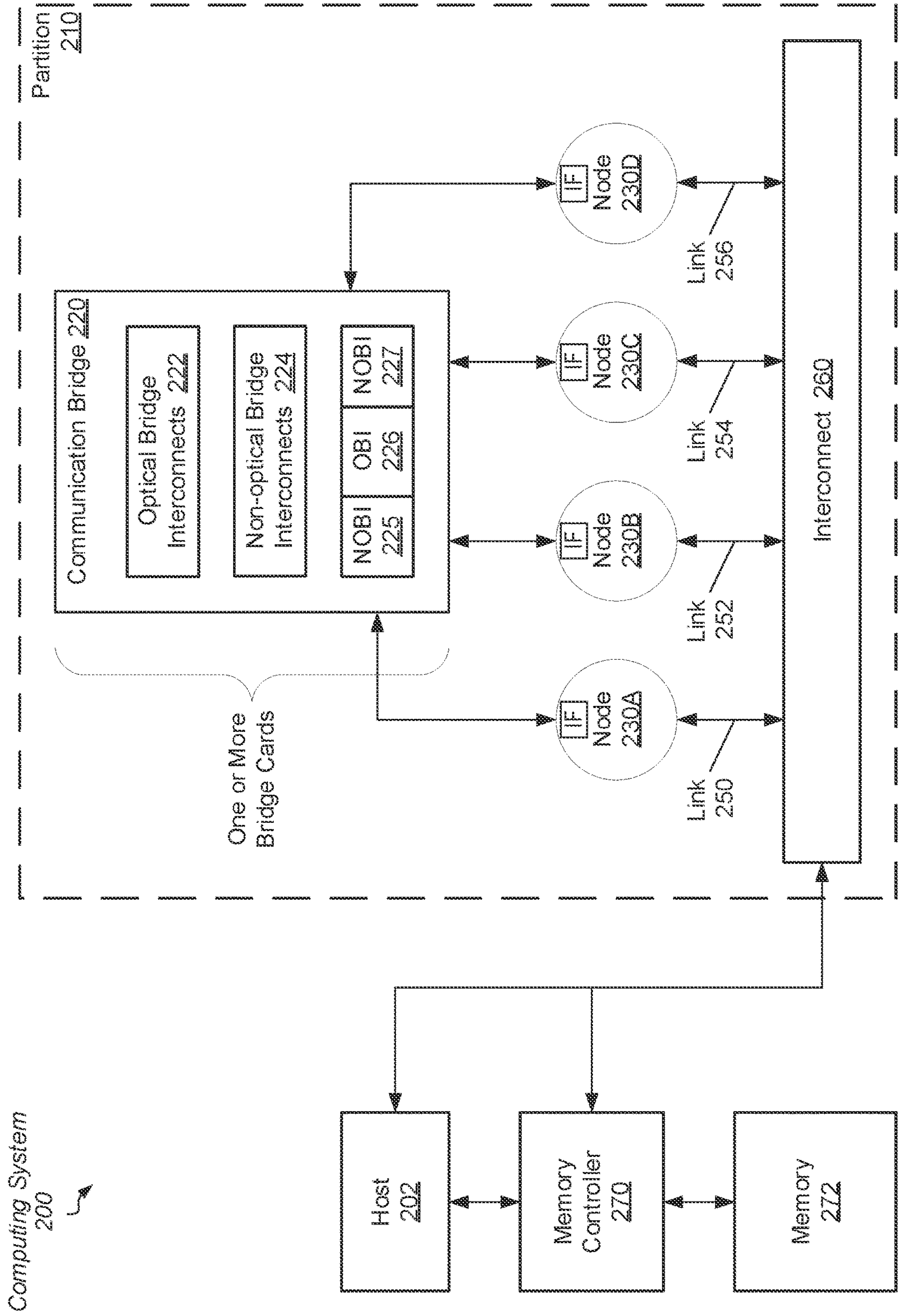
FIG. 2 is a generalized diagram of one embodiment of a computing system.

Turning now to FIG. 2, a generalized block diagram of one embodiment of a multi-node computing system 200 is shown. In the illustrated embodiment, a host processor 202 transfers commands, messages and payload data with a multi-node partition 210 via the interconnect 260. In some designs, the host processor 202 is a general-purpose central processing unit (CPU). The partition 210 includes multiple processing nodes 230A-230D (or nodes 230A-230D). In other embodiments, the computing system 200 has no separate host processor 202, and relies on CPUs or other processors within the nodes 230A-230D to assign and transfer tasks to one another. Power controllers, interrupt controllers, network interfaces, phased locked loops (PLLs) or other clock generating circuitry, cooling systems with fans, and input/output (I/O) devices, such as peripheral devices, are not shown for ease of illustration.

In one embodiment, the partition 210 is a multi-chip module (MCM) placed in a socket of a multi-socket motherboard in a desktop computer or a server. In other embodiments, one or more of the nodes 230A-230D are separate expansion cards placed in a corresponding socket or slot on the motherboard. In an embodiment, one or more of the nodes 230A-230D are video graphics cards placed in a corresponding socket or slot on the motherboard. In various embodiments, the nodes 230A-230D are connected to one another by the communication bridge 220 and/or by the interconnect 260 via the links 250-256. The nodes 230A-230D are connected to the memory controller 270 via the interconnect 260, and use the memory controller 270 to access the memory 272.

Although a single memory controller 270 is shown, in other embodiments, another number of memory controllers are used in computing system 200. In various embodiments, memory controller 270 receives memory requests from one or more of the host processor 202 and the partition 210, and schedules the memory requests using arbitration logic, and sends the scheduled memory requests to memory 272. In an embodiment, memory 272 is system memory for the computing system 200, and memory 272 is one of a variety of dynamic random access memory (DRAM) with a corresponding communication protocol supported by the memory controller 270. The communication protocol determines values used for information transfer, such as a number of data transfers per clock cycle, signal voltage levels, signal timings, signal and clock phases and clock frequencies. In some embodiments, the computing system 200 is also connected to main memory, which is a lower level than the system memory 272 in a hierarchical memory subsystem. Main memory is implemented with one of a variety of types of non-volatile, random access secondary storage of data. Examples of main memory are hard disk drives (HDDs) and solid-state disks (SSDs).

In various embodiments, interconnect 260 supports communication using point-to-point, packet-based, bus-based, including shared bus configurations, crossbar configurations, and hierarchical buses with bridges. In some embodiments, interconnect 260 utilizes a communication fabric (or fabric). In some embodiments, link interfaces across the computing system 200 and interconnect 260 includes queues for storing requests and responses, and selection logic implemented by hardware circuits capable of arbitrating between received requests before sending requests across interconnect 260. Interconnect 260 also includes circuitry capable of building and decoding packets, and selecting routes for the packets. Interconnect 260 transfers data, such as requests, responses, commands, messages, and payload data, back and forth between the partition 210 and the host processor 202 and the memory controller 270. Link interfaces across the computing system 200 and interconnect 260 supports a communication protocol for transferring commands and data. Similar to the memory communication protocol, the supported communication protocol of interconnect 260 determines values such as a number of data transfers per clock cycle, signal voltage levels, signal timings, signal and clock phases and clock frequencies. Examples of the communication protocol of interconnect 260 are PCIe (Peripheral Component Interconnect Express), Infinity Fabric from Advanced Micro Devices, Inc., Infinity Architecture from Advanced Micro Devices, Inc., InfiniB and, RapidIO, HyperTransport, and so forth. Other examples of communication protocols are also possible and contemplated.

Although a single line is shown to represent link 250, the link 250 includes multiple lines, or physical wires or lanes, capable of transferring data as signals. Examples of these multiple lines are one or more clock lines, one or more control lines, one or more high-speed data lines, and one or more low-speed data lines. Circuitry in the physical units of link interfaces support data transmission rates on the one or more high-speed lines greater than data transmission rates of the one or more low-speed lines. The one or more high-speed data lines are referred to as the physical layer of link 250. The one or more control lines and the one or more low-speed lines are referred to as the communication layer of link 250. Links 252-256 have similar lines as link 250. Although four links 250-256 are shown, in other designs, another number of links are used.

Each of the nodes 230A-230D includes one or more processors, local memory, a power controller, and so on. In some designs, the nodes 230A-230D are non-uniform memory access (NUMA) nodes utilizing GPUs to process tasks. Although four nodes 230A-230D are shown, in other designs, another number of nodes are used. In an embodiment, interface circuitry in the nodes 230A-230D and the communication bridge 220 support a same communication protocol such as the xGMI (inter-chip global memory interconnect) for GPU-to-GPU interconnections from Advanced Micro Devices, Inc. However, other types of communication protocols are possible and contemplated. The communication bridge 220 represents one or more bridge cards used to directly transfer data between the nodes 230A-230D without transferring signals on the motherboard. As described earlier, the one or more bridge cards utilize a glass-reinforced epoxy laminate material, such as the FR-4 glass epoxy, with embedded signal traces on the top and/or the bottom layer of the printed circuit board.

The non-optical bridge interconnects 224 represents the embedded copper traces on the one or more bridge cards. The optical bridge interconnects 222 represents the embedded fiber optic cables on the one or more bridge cards. In some embodiments, communication bridge 220 includes the combination of non-optical bridge interconnect 225, optical bridge interconnect 226, and non-optical bridge interconnect 227. Such a combination includes embedded copper traces on the glass epoxy material that transfer electrical signals with node 230A, in one example. These copper traces are routed to an interface unit (not shown) placed on the bridge card between non-optical bridge interconnect (NOBI) 225 and optical bridge interconnect (OBI) 226. Similar to interface units on one or more of the nodes 230A-230D that support optical data transmission, this interface unit on the bridge card converts the electrical signals to optical signals using photonic integrated circuits. The converted optical signals are transferred across the bridge card in a fiber optic cable embedded in the glass epoxy material.

Another interface unit at the end of the bridge card receives the optical signals. This interface unit is located between the optical bridge interconnect (OBI) 226 and the non-optical bridge interconnect (NOBI) 227. This interface unit converts the optical signals to electrical signals, which are sent to the node 230D, in one example. In some implementations, the combination of the NOBI 225, the OBI 226 and the NOBI 227 on one of the bridge cards is used when the nodes 230A and 230D do not include interfaces that support processing optical signals, but a high transfer rate is preferred. In other implementations, the combination of the NOBI 225, the OBI 226 and the NOBI 227 on one of the bridge cards is used when a trace length limit is met for copper traces of the communication bridge 220. For example, one or more of the nodes 230A and 230D have a copper trace length limit of 3 inches, but the nodes 230A and 230D are located 6 inches away from one another in the partition 210. Other conditions for the use of this combination include reducing power consumption, improving error rates of data transmission, and so forth. In some embodiments, hardware, such as circuitry, on the bridge card receives indications of one or more of these conditions and determines which signals to transfer through the combination of the NOBI 225, the OBI 226 and the NOBI 227. It is possible that the nodes 230A and 230D are unaware of the data conversions occurring on the bridge card.

Figure 3:
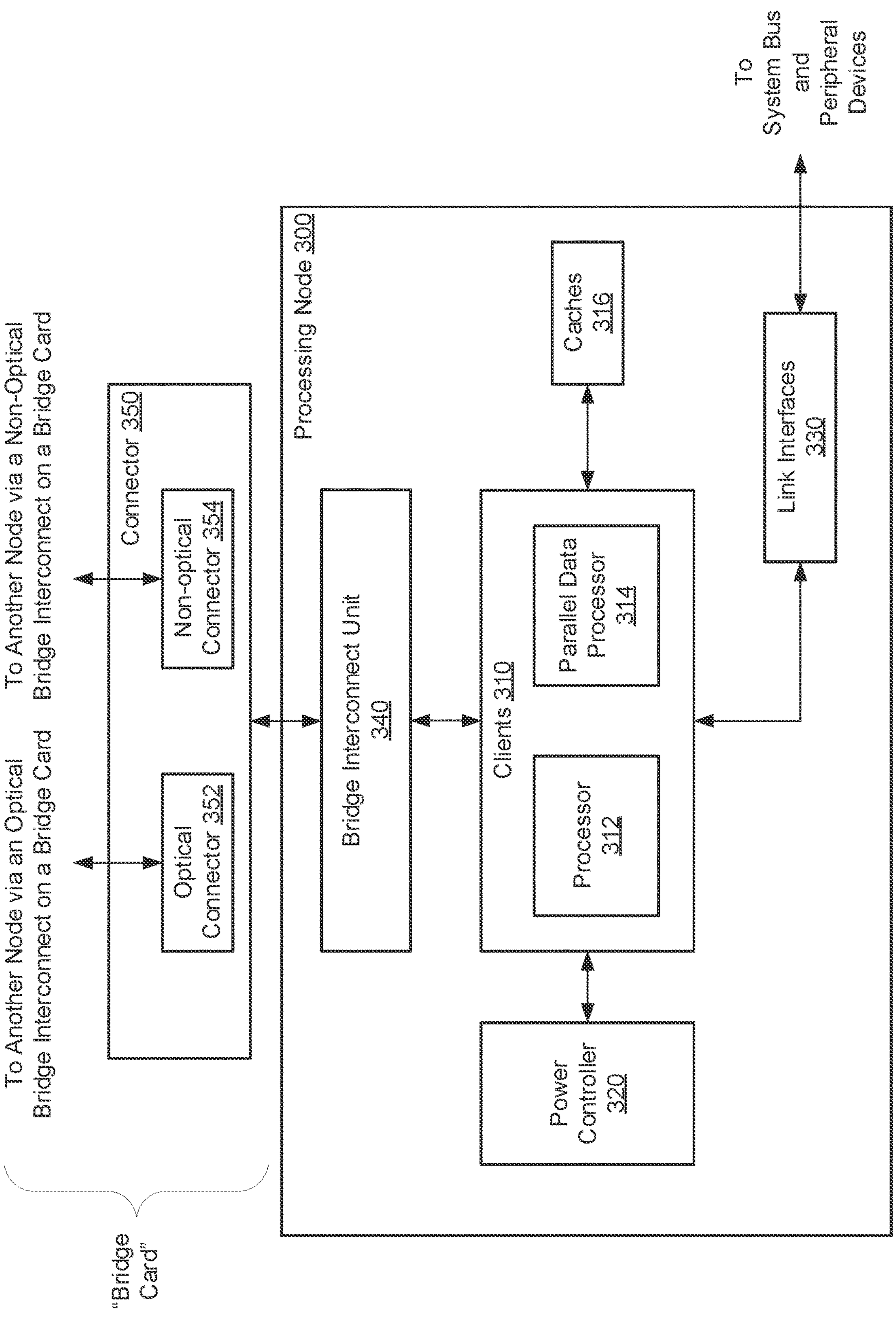
FIG. 3 is a generalized diagram of one embodiment of a processing node.

Referring to FIG. 3, a generalized block diagram of one embodiment of a processing node 300 is shown. As shown, processing node 300 includes clients 310, one or more levels of caches 316, power controller 320, link interfaces 330, and bridge interconnect unit 340. Bridge interconnect 340 communicates with connector 350, which includes connectors 352 and 354. Although both an optical connector 352 and a non-optical connector 354 are shown, in some embodiments, connector 350 includes only one of the connectors 352 and 354. In other embodiments, connector 350 includes multiple optical connectors and/or multiple non-optical connectors. In some embodiments, the components of processing node 300 are individual dies on an integrated circuit (IC), such as a system-on-a-chip (SOC). In other embodiments, the components are individual dies in a system-in-package (SiP) or a multi-chip module (MCM). Interrupt controllers, memory interfaces, clock generating circuitry, a communication fabric, and so on, are not shown for ease of illustration.

Although clients 310 is shown to include two processors, in other embodiments, clients 310 includes another number of processors and processing engines. In the illustrated embodiment, clients 310 includes processor 312 and parallel data processor 314. In some designs, the clients 310 includes the processor 312, which is one or more of a central processing unit (CPU), a hub for communicating with a multimedia engine, and other types of computing resources with circuitry capable of processing instructions of software applications. In an embodiment, the parallel data processor 314 is one of a graphics processing unit (GPU), a digital signal processor (DSP), a field programmable gate array (FPGA), or other type of processor capable of simultaneously processing a same instruction on multiple data items.

The parallel data processor 314 has a high parallel data microarchitecture with a significant number of parallel execution lanes. The high parallel data microarchitecture provides high instruction throughput for a computational intensive task. In one embodiment, the microarchitecture uses a single-instruction-multiple-data (SIMD) pipeline for the parallel execution lanes. Compilers extract parallelized tasks from program code to execute in parallel on the system hardware. The parallelized tasks come from at least scientific, medical and business (finance) applications with some utilizing neural network training. The tasks include subroutines of instructions to execute. In various embodiments, the multiple execution lanes of the parallel data processor 314 simultaneously execute a wavefront, which includes multiple work-items. A work-item is a same instruction to execute with different data. A work-item is also referred to as a thread.

In some designs, the processing node 300 includes no general-purpose CPU, but receives assigned tasks from an external CPU. For example, one interface of link interfaces 330 of the processing node 300 supports a communication protocol connection for transferring commands and data with the external CPU. Examples of the communication protocol are PCIe (Peripheral Component Interconnect Express), Infinity Fabric from Advanced Micro Devices, Inc., Infinity Architecture from Advanced Micro Devices, Inc., InfiniBand, RapidIO, HyperTransport, and so forth. Other examples of communication protocols are also possible and contemplated.

In one embodiment, power controller 320 collects data from components of the processing node 300. In some embodiments, the collected data includes predetermined sampled signals. The switching of the sampled signals indicates an amount of switched capacitance. Examples of the selected signals to sample include clock gater enable signals, bus driver enable signals, mismatches in content-addressable memories (CAM), CAM word-line (WL) drivers, and so forth. In an embodiment, power controller 320 collects data to characterize power consumption in node 300 during given sample intervals (periods of time).

In some embodiments, on-die current sensors and temperature sensors in processing node 300 also send information to power controller 320. Power controller 320 uses one or more of the sensor information, a count of issued instructions or issued threads, and a summation of weighted sampled signals to estimate power consumption for the processing node 300. Power controller 320 decreases (or increases) power consumption if node 300 is operating above (below) a threshold limit. In some embodiments, power controller 320 selects a respective power management state for each of the components in the processing node 300. Therefore, the power controller 320 and accompanying circuitry throughout the processing node 300 are capable of power gating components of node 300, or reducing a power management state of the components. The power controller 320 is also capable of sending control signals to components of node 300 to remove connection from a transitioning clock signal and a connection from a power supply reference. The power controller 320 is further capable of sending control signals to bridge interconnect unit 340 affecting selection of which one of the connectors 352 and 354 to use for transferring data to an external node.

In some embodiments, the address space of processing node 300 is divided among the parallel data processor 314, one or more other computing resources (not shown), one or more other external processing nodes connected to the processing node 300, any external CPU, one or more other components such as input/output (I/O) peripheral devices (not shown) and other types of computing resources. Memory maps are maintained for determining which addresses are mapped to which component, and hence to which component a memory request for a particular address should be routed.

Cache fill data received from system memory is conveyed to a corresponding one or more of the caches 316 and an internal cache memory of the parallel data processor 314. In other words, the cache fill line is placed in one or more levels of caches. In some designs, the parallel data processor 314 includes a level one (L1) instruction cache and an L1 data cache. The caches 116 provides one or more of a level two (L2) cache and a level three (L3) cache used in the hierarchical cache memory subsystem. Other numbers of levels and other placement of the caches whether internal to the parallel data processor 314 or external placement are possible and contemplated.

The bridge interconnect unit 340 receives and sends data to the optical connector 352 and the non-optical connector 354. Although one connector of each of an optical type and a non-optical type are shown, in other designs, another number of connectors are used. In some embodiments, the optical connector includes a photonic integrated circuit to translate between electrical and optical information, whereas, in other embodiments, the photonic integrated circuit is located in the bridge interconnect unit 340. The bridge interconnect unit 340 manages data transfer across one or more bridge interconnects (e.g., optical and non-optical bridge interconnects) for the processing node 300. The bridge interconnect unit 340 determines which one or more bridge interconnects between its node 300 and an external node are operational. For example, the bridge interconnect unit 340 detects when a bridge card has a connection plugged in or inserted in one or more connections available to the bridge interconnect unit 340.

Based on which of the connectors 352 and 354, or both, that is available, the bridge interconnect unit 340 determines the type of bridge interconnect that is operational. For example, the bridge interconnect unit 340 determines an optical data connection is available when detecting the connector 352 of a corresponding bridge card is connected to an optical connector within the bridge interconnect unit 340. Based on determining that there is an operational optical bridge interconnect between the node 300 and an external node, the bridge interconnect unit 340 transfers data with the external node using the optical bridge interconnect. In some embodiments, the bridge interconnect unit 340 switches between using an optical bridge interconnect via connector 352 and a non-optical bridge interconnect via connector 354 based on one or more factors such as measured power consumption and measured data transmission error rates.

Figure 4:
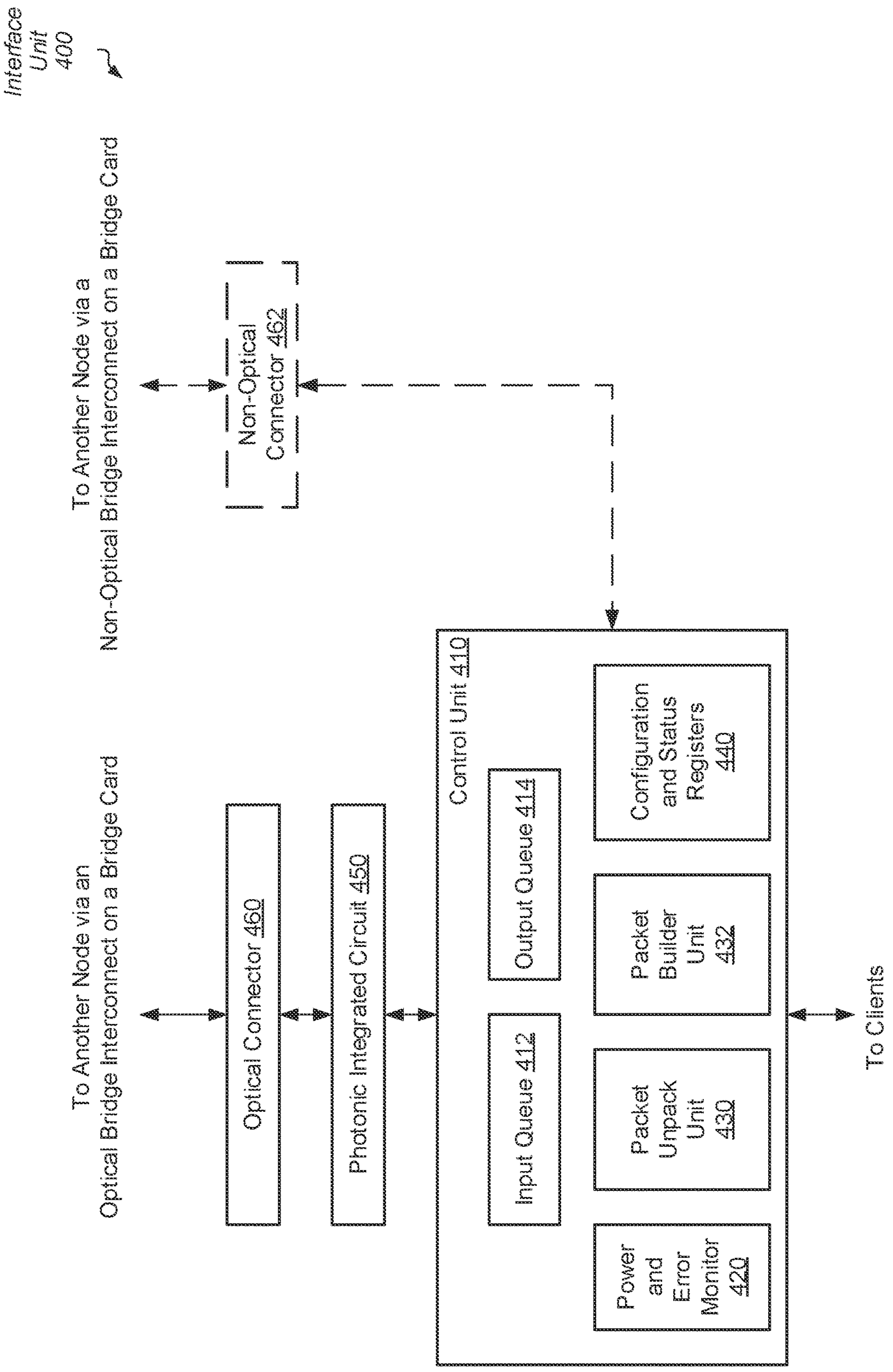
FIG. 4 is a generalized diagram of one embodiment of a bridge interconnect unit.

Turning to FIG. 4, a generalized block diagram of one embodiment of an interface unit 400 is shown. As shown, the interface unit 400 includes the control unit 410, a photonic integrated circuit 450, an optical connector 460, and a non-optical connector 462. The control unit 410 transfers data with one or more clients. As described earlier, examples of the clients are a CPU, a hub for communicating with a multimedia engine, a GPU, a DSP, a FPGA, an application specific integrated circuit (ASIC), and so forth. The data being transferred includes read access requests, snoop requests, write access requests, read responses, control acknowledgments, control commands, command responses, and so forth. In some embodiments, interface unit 400 includes the same functionality as bridge interconnect unit 340 (of FIG. 3) and the interfaces (IFs) of nodes 110A-110D (of FIG. 1) and nodes 230A-230D (of FIG. 2). It is possible that the functionality of the interface unit 400 is placed in one or more of a processing node and a processing unit on the bridge card supporting data transmission between two nodes across the bridge card.

In some embodiments, the input queue 412 stores packets received from the connectors 460 and 462, which are later unpacked by the packet unpack unit 430 before sending to the one or more clients. The output queue 414 stores packets generated by the packet builder unit 432, which are packets to send to one of the connectors 460 and 462. Although two queues 412 and 414 are shown, in other designs, another number of queues are used and store data based on predetermined criteria.

The packet builder unit 432 (or unit 432) determines which candidate requests, responses and commands are inserted in a packet being generated for transmission. In some embodiments, the unit 432 also performs data compression and inserts metadata in the packet header indicating the data compression performed. The packet unpack unit 430 (or unit 430) analyzes the packet header of a packet selected from the input queue 412, and unpacks the selected packet based on indications stored in the packet header. One or more of the units 430 and 432 use thresholds and parameters stored in the configuration and status registers (CSRs) 440. The units 430 and 432 also include arbitration logic for selecting data stored in the queues 412 and 414 based on programmable priorities and formulas indicated by values stored in the CSRs 440.

The photonic integrated circuit (IC) 450 translates, or converts, electrical signals to optical signals, and vice-versa. The control unit 410 and the remainder of the corresponding processing node uses electrical components such as passive elements (e.g., resistors, inductors, capacitors) and active elements (e.g., transistors) and electron flux to transfer and process electrical information. In contrast, the photonic IC 450 uses photonic components that rely on photons, or light, to transfer and process optical information. Examples of the photonic components are light sources or lasers, waveguides, polarizers, phase shifters, and modulators. The photonic IC 450 sends and receives optical information through the optical connector 460 and the optical bridge interconnect. The optical bridge interconnect includes optical fiber made of silica used for transferring optical data between two processing nodes. In some embodiments, the optical connector 460 is a fiber coupler that provides a chip-to-fiber interface.

The photonic IC 450 receives electrical signals from the output queue 414 of the control unit 410, and uses these electrical signals to control light sources, or lasers, of the photonic IC 450 in a modulator that performs electrical-to-optical bit conversion. The lights sources provide light using wavelengths in a range between the visible spectrum and infrared such as between 800 nanometers and 1,700 nanometers. In an embodiment, the light source and the modulator use a distributed feedback laser diode and an electro-absorption modulator to implement externally modulated lasers (EML) on an indium phosphide (InP) chip. Fabricating the photonic IC on indium phosphide provides integration of various optically active and passive functions on a same chip.

The photonic IC 450 also includes a filter for multiplexing and de-multiplexing prior to sending optical information to the fiber coupler of the optical connector 460. Rather than sizing electrical components such as capacitors, resistors and transistors to drive electron flux, the amount of light provided (injected) by the light sources (lasers) of the photonic IC 450 is controlled ("sized") by the modulator that receives the electrical data from the output queue 414 of the control unit 410. The photonic components are reversed for receiving optical information from the optical bridge interconnect, such as optical fiber cables, and converting this information to electrical signals that are sent to the input queue 412 for data storage. Compared to electrical signal equivalents, the data transmission provided by the optical bridge interconnect, the optical connector 460 and the photonic IC 450 provides further reduction in on-die area, higher data rates, and lower power consumption.

In some embodiments, the interface unit 400 also includes the non-optical connector 462. As described earlier, the non-optical bridge interconnect is a flexible cable with multiple layers of etched copper wires used as transmission lines between two processing nodes. The non-optical connector 462 supports data transmission on an available non-optical bridge interconnect when one is provided. In one example, a bridge card connected to a processing node that includes the interface unit 400 is a hybrid bridge card supporting both an optical bridge interconnect and a non-optical bridge interconnect. In such cases, the control unit 410 determines which packets to send on the optical bridge interconnect via the optical connector 460 and which packets to send on the non-optical bridge interconnect via the non-optical connector 462.

In some cases, the control unit 410 determines to send packets corresponding to a particular data type to the non-optical connector 462, whereas, packets of other data types are sent to the optical connector 460. In one embodiment, the particular data type is data corresponding to an audio file. However, in other embodiments, another data type is selected for sending to the non-optical connector 462, whereas, packets of other data types are sent to the optical connector 460. In an embodiment, one or more programmable registers of the CSRs 440 store an indication of the particular one or more data types that should have corresponding packets sent to the non-optical connector 462 when the optical connector 460 is available.

In some embodiments, the power and error monitor 420 (or monitor 420) receives an indication of measured power consumption during a particular time interval (period of time) of the processing node that includes the interface unit 400. In some embodiments, when this measured power consumption is greater than a threshold, the control unit 410 switches sending a particular data type to the non-optical connector 462 to sending the particular data type to the optical connector 460. As described earlier, power consumption for data transmission on the optical bridge interconnect is less than data transmission on the non-optical bridge interconnect. In another embodiment, when the monitor 420 determines a data transmission error rate of a particular connector of the connectors 460 and 462 is greater than a threshold, the control unit 410 switches from sending data to the particular connector to sending data to the other one of the connectors 460 and 462.

Figure 5:
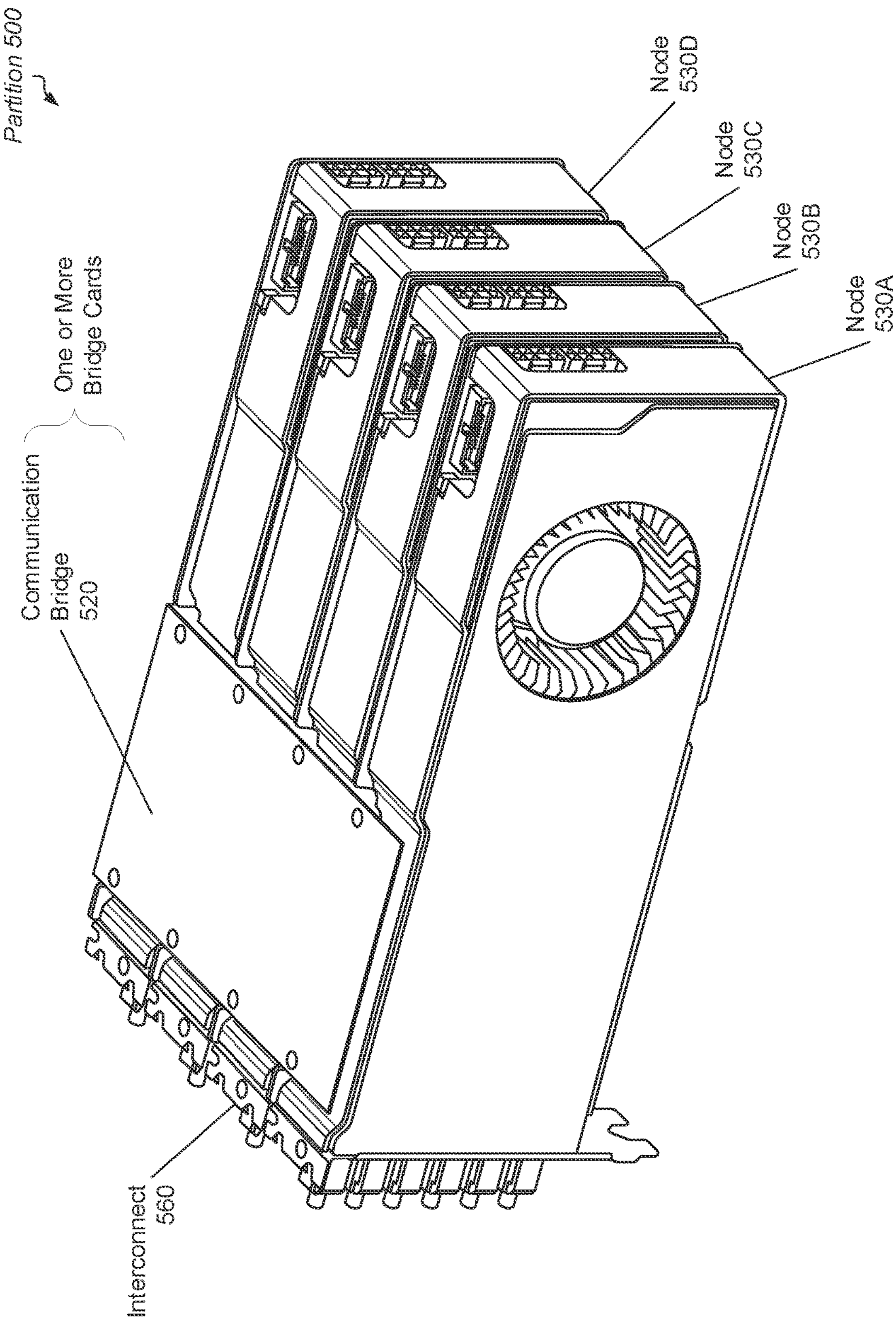
FIG. 5 is a generalized diagram of one embodiment of a partition of a computing system.

Turning to FIG. 5, a generalized block diagram of one embodiment of a partition 500 of a computing system is shown. As shown, the partition 500 includes the communication bridge 520, the nodes 530A-530D, and interface 560. In an embodiment, the communication bridge 520 includes the functionality of communication bridge 220 (of FIG. 2), and the nodes 530A-530D include the functionality of the nodes 110A-110D (of FIG. 1), the nodes 230A-230D (of FIG. 2), the processing node 400 (of FIG. 4). Additionally, the interconnect 560 includes the functionality of interconnect 160 (of FIG. 1) and interconnect 260 (of FIG. 2). In some embodiments, the partition 500 is used to provide multiple graphics cards to a computing system while utilizing optical data transmission and steering data transmission between available optical bridge interconnects and available non-optical bridge interconnects.

Figure 6:
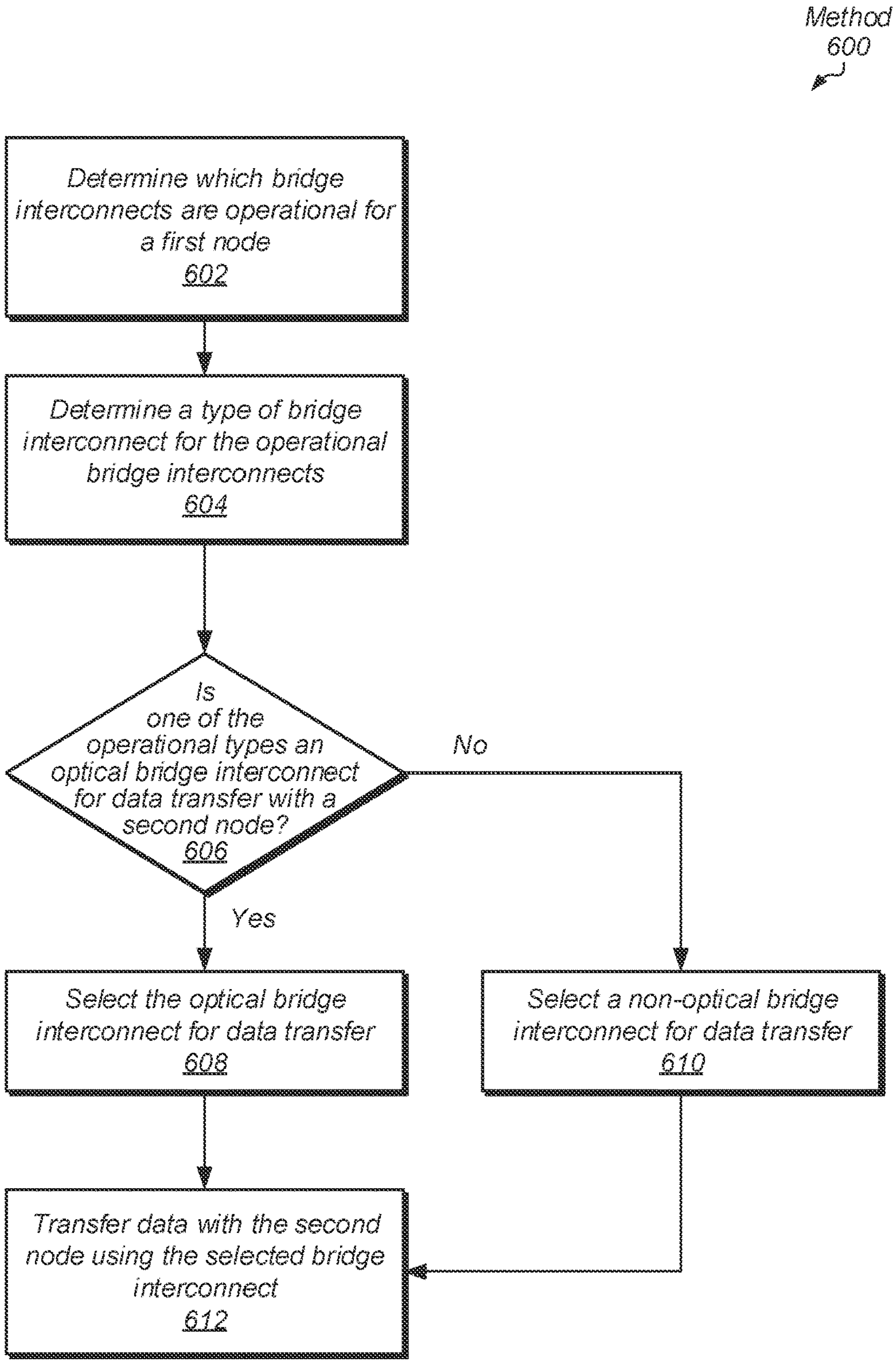
FIG. 6 is a generalized diagram of one embodiment of a method for efficient data transfer in a computing system.

Referring to FIG. 6, one embodiment of a method 600 for efficient data transfer in a computing system is shown. For purposes of discussion, the steps in this embodiment (as well as in FIGS. 7-8) are shown in sequential order. However, in other embodiments some steps occur in a different order than shown, some steps are performed concurrently, some steps are combined with other steps, and some steps are absent.

Two or more nodes are placed in a multi-node partition of a computing system. The nodes include at least one or more processors, local memory, a power controller, and a bridge interconnect unit. Tasks are assigned to the partition by a host processor or by the nodes themselves. Each of the nodes is capable of sending direct memory access (DMA) requests as well as other commands, messages, responses, and tasks to another one of nodes. A control unit of an interface of a first node determines, or otherwise identifies, which bridge interconnects are operational for the first node (block 602). For example, the control unit detects whether a bridge card is connected to a corresponding connector of the first node. In addition, the control unit identifies two or more connectors being capable of transferring data with the two connectors including a first connector of a first type and a second connector of a second type different from the first type. In various embodiments, the first type of connector is capable of transferring data via an optical interconnect and the second type of connector is capable of transferring data via a non-optical interconnect. The control unit determines a type of bridge interconnect for the operational bridge interconnects (block 604). For example, based on the operational connector, the control unit is capable of determining whether a particular bridge interconnect is optical or non-optical.

If one of the operational types is an optical bridge interconnect for data transfer with a second node ("yes" branch of the conditional block 606), then the control unit selects the optical bridge interconnect for data transfer (block 608). Otherwise, if none of the operational types is an optical bridge interconnect for data transfer with a second node ("no" branch of the conditional block 606), then the control unit selects a non-optical bridge interconnect for data transfer (block 610). Therefore, in such cases, the optical branch interconnect is the default, or preferred, branch interconnect to use for data transfer between the first node and the second node. The first node transfers data with the second node using the selected bridge interconnect (block 612). As described earlier, at least one bridge card utilizes a glass-reinforced epoxy laminate material to implement the printed circuit board with one or more fiber optic cables embedded in grooves of this epoxy laminate material on the top and/or bottom layer. Such a bridge card is capable of transferring data using optical signals. It is noted that if no branch interconnect is available, such as there is no optical or non-optical branch interconnect available, then the first node transfers data with the second node using a system bus on the motherboard, rather than using any direct bridge interconnect.

Figure 7:
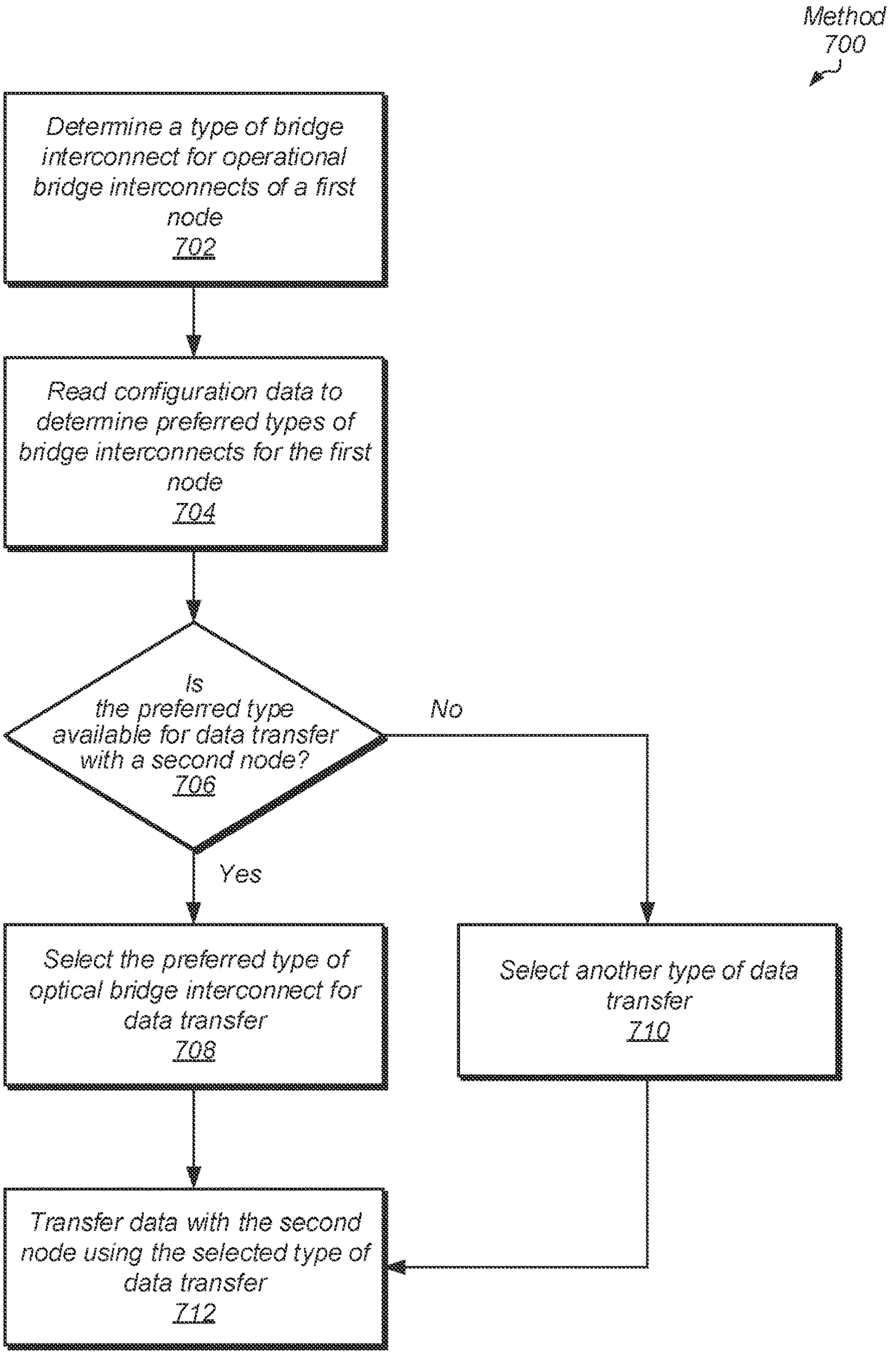
FIG. 7 is a generalized diagram of one embodiment of a method for efficient data transfer in a computing system.

Turning to FIG. 7, one embodiment of a method 700 for efficient data transfer in a computing system is shown. In a multi-node partition, a control unit of a bridge interconnect unit determines a type of bridge interconnect for operational bridge interconnects of a first node (block 702). The control unit reads configuration data to determine preferred types of bridge interconnects for the first node (block 704). In an embodiment, the configuration data determines a preferred type of bridge interconnect to use based on data type. In one example, an optical bridge interconnect is preferred for video frame data and a non-optical bridge interconnect is preferred for data of an audio file. Other data types and preferred assignments are possible and contemplated. In an embodiment, indications of the assignments are stored in programmable configuration registers.

If the control unit determines the preferred type of bridge interconnect is available for data transfer with a second node ("yes" branch of the conditional block 706), then the control unit selects the preferred type of bridge interconnect for data transfer (block 708). Otherwise, if the control unit determines the preferred type of bridge interconnect is unavailable for data transfer with the second node ("no" branch of the conditional block 706), then the control unit selects another type of bridge interconnect for data transfer (block 710). The first node transfers data with the second node using the selected type of bridge interconnect (block 712). In various embodiments, at least one bridge card utilizes a glass-reinforced epoxy laminate material to implement the printed circuit board with one or more fiber optic cables embedded in grooves of this epoxy laminate material on the top and/or bottom layer. Such a bridge card is capable of transferring data using optical signals. As described earlier, it is noted that if no branch interconnect is available, such as there is no optical or non-optical bridge interconnect available, then the first node transfers data with the second node using a system bus on the motherboard, rather than using any direct bridge interconnect.

Figure 8:
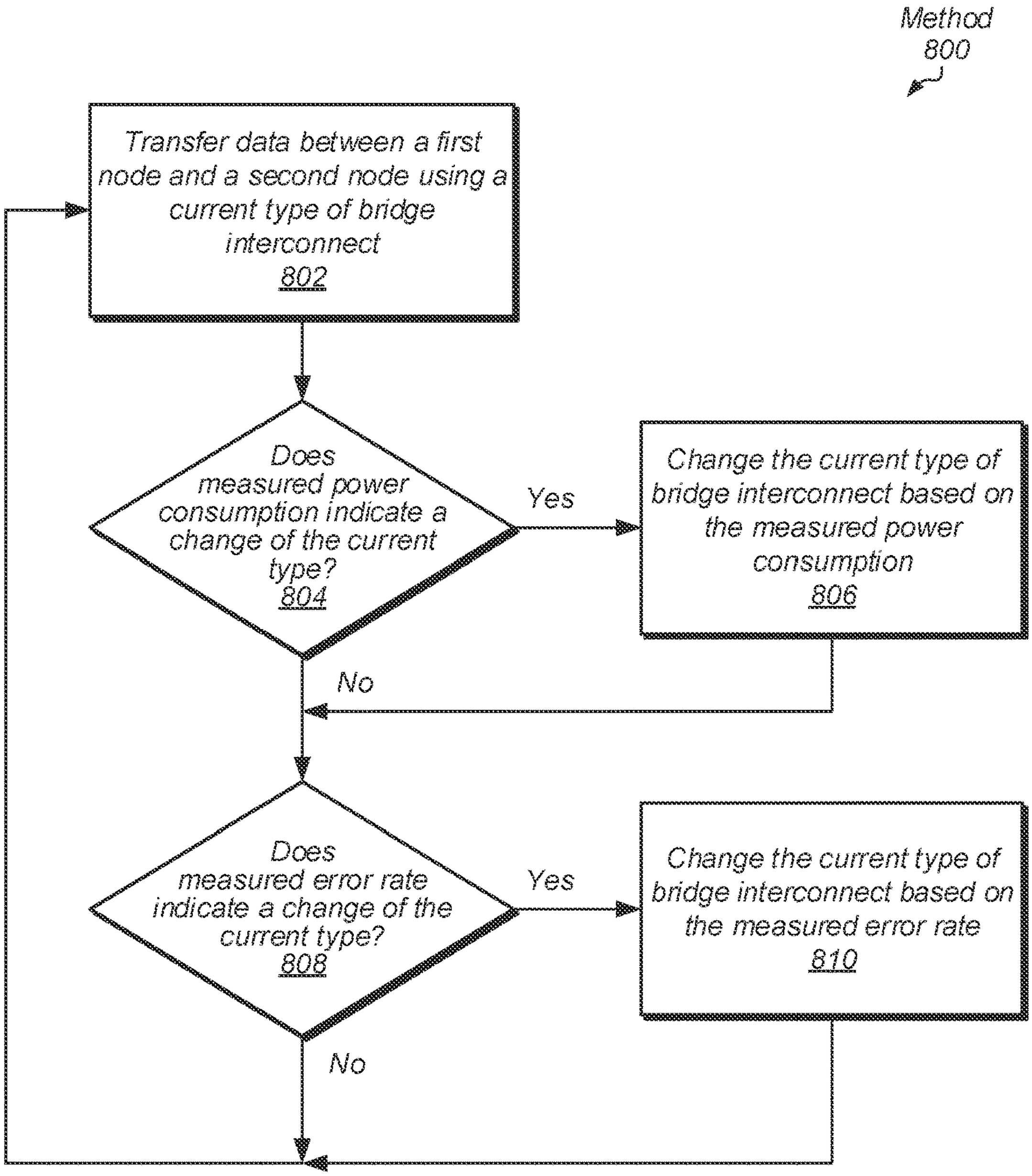
FIG. 8 is a generalized diagram of one embodiment of a method for efficient data transfer in a computing system.

Turning to FIG. 8, one embodiment of a method 800 for efficient data transfer in a computing system is shown. A first node of a multi-node partition transfers data with a second node using a current type of bridge interconnect (block 802). The current type is one of an optical bridge interconnect and a non-optical bridge interconnect. A control unit of a bridge interconnect unit monitors power consumption of the first node. In other implementations, the control unit receives an indication of the power consumption of the first node from a power controller. If the control unit determines the measured power consumption does not indicate a change of the current type ("no" branch of the conditional block 804), then the control unit maintains the current type of bridge interconnect based on the measured power consumption. However, if the control unit determines the measured power consumption indicates a change of the current type ("yes" branch of the conditional block 804), then the control unit changes the current type of bridge interconnect based on the measured power consumption (block 806). In one example, the current type is a non-optical bridge interconnect and the measured power consumption is greater than a first threshold. Therefore, the control unit changes the current type to an optical bridge interconnect, if available, for data transfer with the second node. The optical bridge interconnect consumes less power for data transmission than the non-optical bridge interconnect.

In some embodiments, the control unit monitors an error rate of data transfer between the first node and the second node. In other embodiments, the control unit receives an indication of the error rate from another unit. If the control unit determines the measured error rate does not indicate a change of the current type ("no" branch of the conditional block 808), then the control unit maintains the current type of bridge interconnect based on the measured error rate. However, if the control unit determines the measured error rate indicates a change of the current type ("yes" branch of the conditional block 808), then the control unit changes the current type of bridge interconnect based on the measured error rate (block 810). Afterward, the control flow of method 800 returns to block 802 where the first node transfers data with the second node.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:

control circuitry configured to:

transfer first data via a first connector of a plurality of connectors; and in response to detecting that monitored electrical power consumption of the first connector exceeds a threshold, change transmission of the first data from the first connector to a second connector of the plurality of connectors that provides a higher data transfer rate than the first connector.

2. The apparatus as recited in claim 1, wherein the control circuitry is further configured to change transmission of the first data from the second connector to the first connector, responsive to a data transmission error rate of the second connector exceeding an error rate threshold.

3. The apparatus as recited in claim 2, wherein the control circuitry is further configured to transfer data with the second connector at lower electrical power consumption than transferring data with the first connector.

4. The apparatus as recited in claim 1, wherein the first connector is a non-optical connector and the second connector is an optical connector.

5. The apparatus as recited in claim 1, wherein the transmission is between two processing circuits comprising one or more of a digital signal processor (DSP), a field programmable gate array (FPGA), and another type of processing circuit capable of simultaneously processing a same instruction on multiple data items.

6. The apparatus as recited in claim 1, wherein the transmission is between two graphics processing units (GPUs).

7. The apparatus as recited in claim 1, wherein, to transfer second data different from the first data between two nodes, the control circuitry is further configured to:

receive the second data from a first node of the two nodes via the first connector;

adapt the second data for transmission using the second connector without requiring participation by the two nodes; and send the adapted data to a second node of the two nodes via the second connector.

8. A method, comprising:

transferring, by control circuitry of a communication bridge comprising a plurality of bridge interconnects, first data via a first connector of a plurality of connector; and in response to detecting that monitored electrical power consumption of the first connector exceeds a threshold, changing, by the control circuitry, transmission of the first data from the first connector to a second connector of the plurality of connectors that provides a higher data transfer rate than the first connector.

9. The method as recited in claim 8, further comprising changing transmission of the first data from the second connector to the first connector, responsive to data transmission error rate of the second connector exceeding an error rate threshold.

10. The method as recited in claim 9, further comprising transferring data with the second connector at lower electrical power consumption than transferring data with the first connector.

11. The method as recited in claim 8, wherein the first connector is a non-optical connector and the second connector is an optical connector.

12. The method as recited in claim 8, wherein the transmission is between two processing circuits comprising one or more of a digital signal processor (DSP), a field programmable gate array (FPGA), and another type of processing circuit capable of simultaneously processing a same instruction on multiple data items.

13. The method as recited in claim 8, wherein the transmission is between two graphics processing units (GPUs).

14. The method as recited in claim 8, wherein, to transfer second data different from the first data between two nodes of the plurality of the nodes, the method further comprises:

receiving the second data from a first node of the two nodes via the first connector;

converting, unaware to the two nodes, the second data to third data for data transmission using the second connector; and sending the third data to a second node of the two nodes via the second connector.

15. A computing system comprising:

a plurality of nodes, each comprising circuitry configured to process tasks;

a communication bridge comprising:

a plurality of bridge interconnects, each between at least two of the plurality of nodes; and control circuitry configured to:

transfer first data via a first connector of a plurality of connector; and in response to detecting that monitored electrical power consumption of the first connector exceeds a threshold, change transmission of the first data from the first connector to a second connector of the plurality of connectors that provides a higher data transfer rate than the first connector.

16. The computing system as recited in claim 15, wherein the control circuitry is further configured to change transmission of the first data from the second connector to the first connector, responsive to data transmission error rate of the second connector exceeding an error rate threshold.

17. The computing system as recited in claim 16, wherein the control circuitry is further configured to transfer data with the second connector at lower electrical power consumption than transferring data with the first connector.

18. The computing system as recited in claim 15, wherein the first connector is a non-optical connector and the second connector is an optical connector.

19. The computing system as recited in claim 15, wherein the transmission is between two processing circuits comprising one or more of a digital signal processor (DSP), a field programmable gate array (FPGA), and another type of processing circuit capable of simultaneously processing a same instruction on multiple data items.

20. The computing system as recited in claim 15, wherein the transmission is between two graphics processing units (GPUs).

* * * * *